(12) United States Patent
Baentsch et al.

(10) Patent No.: US 6,772,171 B1
(45) Date of Patent: Aug. 3, 2004

(54) METHOD AND DEVICE FOR CREATING AN OBJECT IN A NON-PERSISTENT MEMORY AND/OR KEEPING ACCESSIBILITY TO SAID OBJECT

(75) Inventors: Michael Baentsch, Langnau (CH); Peter Buhler, Thalwil (CH); Thomas Eirich, Au (CH); Frank Hoering, Zurich (CH); Marcus Oestreicher, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,152

(22) Filed: Apr. 29, 1999

(30) Foreign Application Priority Data

May 4, 1998 (EP) ............................................. 98108054

(51) Int. Cl.[7] ............................................. G06F 17/00
(52) U.S. Cl. .................. 707/103 R; 711/100; 707/200; 707/205
(58) Field of Search .............. 707/1–206; 717/100–119; 711/1–6, 170–173, 100

(56) References Cited

U.S. PATENT DOCUMENTS

| | | | | |
|---|---|---|---|---|
| 5,765,205 A | * | 6/1998 | Breslau et al. ............... | 711/203 |
| 5,768,479 A | * | 6/1998 | Gdelkarim et al. ........... | 706/52 |
| 5,768,593 A | * | 6/1998 | Walters et al. ............... | 717/141 |
| 6,640,244 B1 | * | 10/2003 | Bowman-Amuah .......... | 707/10 |
| 6,643,652 B2 | * | 11/2003 | Helgeson et al. ............. | 707/10 |
| 6,654,765 B2 | * | 11/2003 | Wong et al. ............. | 707/103 R |

FOREIGN PATENT DOCUMENTS

| | | |
|---|---|---|
| EP | 0 690 375 | 1/1996 |
| EP | 0 737 916 | 10/1996 |
| JP | 04-333946 | 11/1992 |
| JP | 05-012107 | 1/1993 |
| JP | 06-067898 | 3/1994 |
| JP | 07-056807 | 3/1995 |

OTHER PUBLICATIONS www.jguru.com/faq/Serialization, as printed Nov. 3, 2002.*
developer.java.sun.com/developer/TechTips/1998/tt0217.html, contents dated 1998.*
java.sun.com/pr/1997/april/pr970402–02.html, Sun Microsystems, Apr. 1997.*
Helaihel et al., Java as a specification language for hardware–software systems, Computer–Aided Design, 1997, Digest of Technical Papers, IEEE/ACM International Conference on, Nov. 9–13, 1997, pp. 690–697.*
Young et al., Design and specification of embedded systems in Java using successive, formal requirement, Design Automation Conference, 1998, Proceedings, Jun. 15–19, 1998, pp. 70–75.*
Gontmakher et al., Characterizations for Java memory behavior, Parallel Processing Symposium, 1998, 1998 IPPS/SPDP, Proceedings of the First Merged International and Symposium on Parallel and Distributed Processing, Mar. 30 –Apr. 03, 1998, pp. 682–.*

(List continued on next page.)

*Primary Examiner*—David Jung
(74) *Attorney, Agent, or Firm*—Louis P. Herzberg; David Aker

(57) ABSTRACT

A method for creating an object in a non-persistent memory is proposed. From an instruction code sequence, a first instruction code is read out which effects the execution of a first function which effects the choice of a non-persistent memory as the location for the next object to be created. This object creation is effected by the execution of a second function which is effected by reading out a second instruction code. Furthermore it is proposed to store a pointer to a transient object in the stack memory and to provide a mechanism for writing this pointer to and reading it from a persistent memory.

34 Claims, 1 Drawing Sheet

OTHER PUBLICATIONS

Teo et al., SPaDES/Java: object–oriented parallel discrete–event simulaton, Simulatioin Symposium, 2002, Proceedings, 35th Annual, Apr. 14–18, 2002, pp. 245–252.*

Mazzuccelli, A model for Java/Corba and OODBMS distributed architectures, Distributed Objects and Applications, 1999, Proceedings of the International Symposium on, Sep. 5–6, 1999, pp. 68–76.*

Malkhi et al., Persistent objects in the Fleet system, DARPA Information Survivability Conference & Exposition II, 2001, DISCEX '01, Proceedings, vol. 2, Jun. 12–14, 2001, pp. 126–136, vol. 2.*

A. Biliris et al., Making C++ Objects Persistent: The Hidden Pointers, Software Practice and Experience, vol. 23, No. 12, Dec. 1, 1993, pp. 1285–1303, XP000567860.

J. E. B. Moss, Working with Persistent Objects: To Swizzle or Not to Swizzle, IEEE Transactions on Software Engineering, vol. 18, No. 8, Aug. 1, 1992, pp. 657–673, XP000343278.

Nagao et al, "What Java Brings Electronic Commerce" Computopia Aug. 1997, pp. 32–35.

* cited by examiner

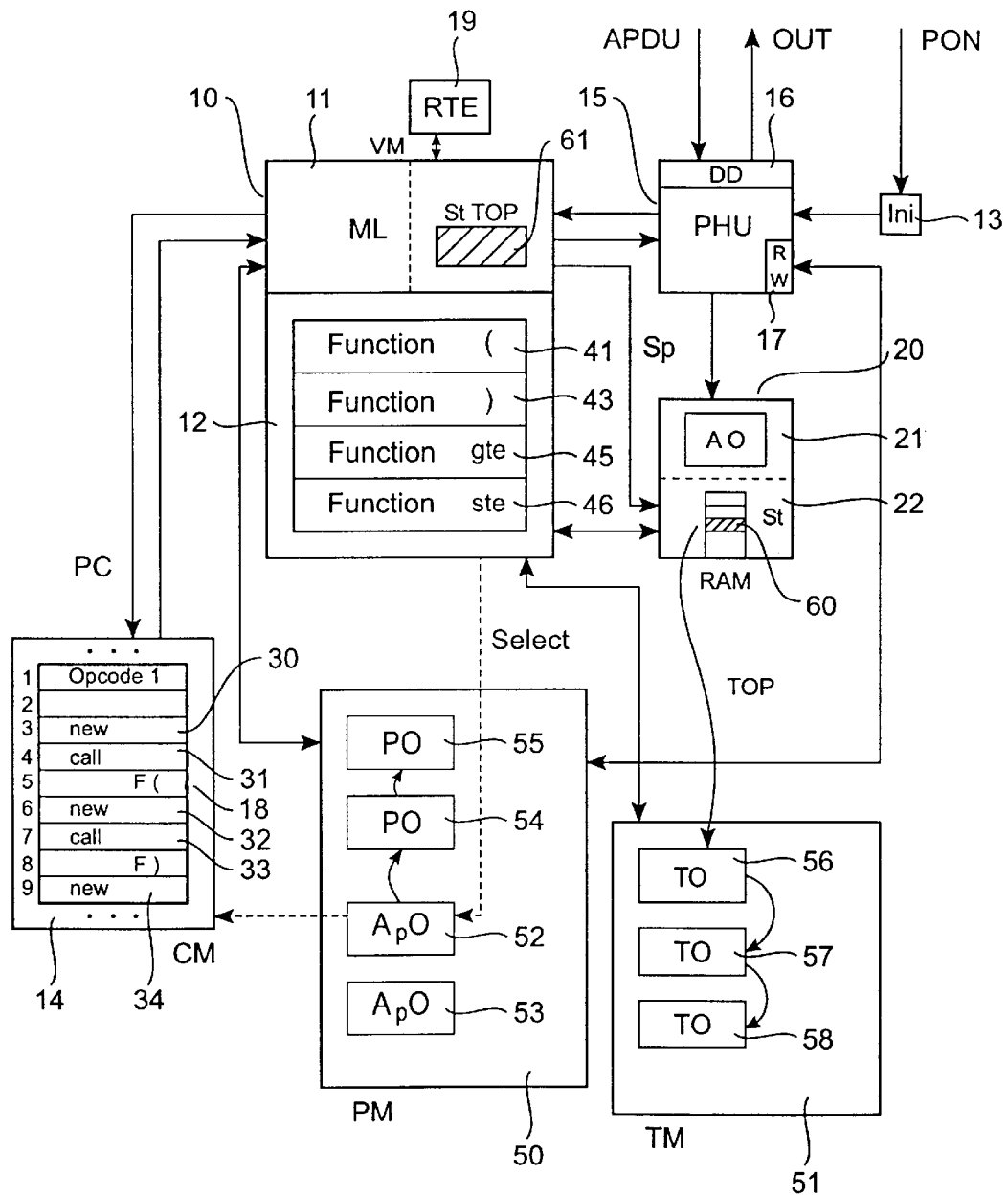

METHOD AND DEVICE FOR CREATING AN OBJECT IN A NON-PERSISTENT MEMORY AND/OR KEEPING ACCESSIBILITY TO SAID OBJECT

FIELD OF THE INVENTION

The invention relates to a method and a device for creating an object in a non-persistent memory. More particularly, the coexistence of persistent and temporary objects in a runtime system for object-based languages is proposed, more particularly for implementation in a virtual machine in a resource-constrained environment such as a smartcard, particularly a smartcard offering a Java environment, such as a Javacard. Furthermore a method is proposed which maintains accessibility of non-persistently stored objects even for several methods of an applet.

TECHNICAL FIELD AND BACKGROUND OF THE INVENTION

As one area of application for the invention, the area of smartcards is suitable, which herein is used henceforth to exemplify the concepts. One of the uses of a smartcard is to store long-life data. Therefore a smartcard contains primarily persistent storage (ROM, EEPROM) and only a limited amount of temporary storage (RAM). The ROM is used to store constant data and code which is valid during the lifetime of a smartcard. Applications can either be stored in ROM during the production process or can be loaded into EEPROM.

As soon as a card is inserted into a device providing power, clock, and communication lines, which device is also called the "terminal", the card is powered on and the runtime environment takes over the control of the system and waits for input from the terminal. The terminal starts a communication with an application by sending a command to the runtime environment, i.e. a select-command, to select an application for further interaction, the so-called "target application". After that, the runtime environment forwards all incoming data to the selected application by invoking the application with the given data. The application processes the data and might create data for the response to the terminal. After the application has finished processing the incoming data, control returns to the runtime environment which sends the response to the terminal. The terminal can now send again data to the selected application. The terminal can also close the communication with the current selected application by sending a new select-command to the runtime environment. The runtime environment informs the currently selected application thus allowing cleanup operations to be performed and afterwards selects the new application. New messages are again forwarded to the newly selected application by invoking the application with the message as argument. The number of selections and messages during a session are not limited. Both the interaction pattern between terminal and card, as well as the separation into runtime and application on the card are important to maintain the integrity of a card running multiple applications. If this separation were not in place, applications could possibly interact in malign ways, e.g. by checking the messages originally intended for other applications.

During a message-driven invocation by the runtime environment as outlined above, an application must be able to create, manipulate and store objects. If an object is desired to be available in an application between different selections, the application needs to store this object in persistent memory, thus making the object accessible after a card insertion in a terminal at a later time.

If transient memory is also available, the system has to provide a functionality to support transient objects therein. The common use of EEPROM as storage technology for transient objects is disadvantageous in several respects. First, modifying-operations on objects in EEPROM are very slow compared to write-operations into RAM. Second, due to technology, the guaranteed number of successful write-operations to a cell in EEPROM is limited. Third, objects in the persistent memory can more easily be scrutinized, since they continue to reside on the card even after power down, thus leading to potential security vulnerabilities.

Object-based applications running inside extremely resource-constrained execution environments, such as smartcards, should be able to create and manipulate persistent and temporary objects. In this context, persistent objects are objects which keep their state between different hardware activations, also called "sessions" and are therefore protected from the effects of (sudden) power down. An e-cash application, for example, may use a persistent object to store the available amount of money between sessions.

In contrast, temporary objects are allocated in temporary memory and are lost at power down. The use of temporary objects increases the performance of an application and provides additional security. The first is due to the vastly reduced access-time to temporary memory as opposed to persistent memory. Secondly, temporary objects containing security-sensitive data are cleared automatically at power down. Therefore, this data cannot be examined after the device has been removed from its power supply.

Conventional systems supporting some form of coexistence of persistent and transient objects typically tend to be complex and accordingly require many resources. Particularly in a resource-constrained environment, it is crucial to reduce this, even when the functionality is thereby reduced. One known mechanism allows to create only certain types of temporary or transient objects, i.e. in form of simple types like short arrays or byte arrays. This reduced functionality is however too restrictive for a number of applications, especially for object-oriented applications.

OBJECT AND ADVANTAGES OF THE INVENTION

A mechanism for supporting persistent and temporary objects in a resource-constrained environment is the proposed solution for the above described problem.

It only requires minimal support by the runtime system, while still providing a simple programming model for both temporary- and persistent object allocation. Moreover, it supports the maintenance of temporary objects between multiple invocations of an application during one session without using persistent memory. It also enables an application to ensure its integrity in case of an unexpected power down.

It is an object of the invention according to claim 1 and 11, to provide a method and a device for creating an object in a non-persistent memory which offers a bigger flexibility in the choice of the object type and at the same time is suited to be implemented in a resource-constrained environment, such as a smartcard, particularly a smartcard offering a Java environment.

Another advantage is the reduced complexity in the allocation of temporary and persistent objects.

The above mentioned objects are met by a method according to claim 1 and a device according to claim 11. Regardless of whether the interpreter, also called "virtual machine", is implemented in software or in hardware, the above problems are solved.

The setting of a sort of marker, i.e. calling a first function which effects the choice of a non-persistent memory as the memory where in a following step an object is created, offers a simple way of switching between the persistent memory and the non-persistent memory.

The use of a function of a bracket-open type is advantageous because a function with a similar functionality, i.e. marking the beginning of a phase or state and marking the end of this phase or state, for other purposes is already known, such that the handling of the bracket function is facilitated by corresponding know-how. The additional complexity to implement the recognition of this function and the correct handling of its meaning, thereby is kept at minimum.

The counterpart is the third function which handles the resetting of the mark. This exploits all advantages of the first function and completes the set of functions such that hence deliberate switching of the storing location for the objects is made possible. Also for this function the advantage counts that a function with a similar functionality, i.e. marking the beginning of a phase or state and marking the end of this phase or state, for other purposes is already known, such that the handling of the bracket function is facilitated by corresponding know-how.

The non-persistent objects of an applet form an object graph. The linking of the persistent objects and/or the non-persistent objects leads to several connected reachable objects in that one object thereof is pointed to as the root object from outside of the non-persistent memory. Only one pointer which points to the respective object is needed for accessing any of these objects.

The method according to claim 18 is guaranteeing the accessibility of temporary objects in the non-persistent memory in that the pointer survives the emptying of the stack wherein the pointer to a transient root object has been stored. Furthermore, the problem that in a following method the pointer from a persistent object to a transient object points to a no longer existing object is circumvented.

When a pointer to an object in the non-persistent memory is stored in a stack memory, no pointer from the persistent memory to the non-persistent memory is needed. The object pointed to is part of a graph and can have pointers to other objects. These linked objects are all reachable by the one pointer which is stored in the stack memory. This proves particularly useful in sudden power-off situations, i.e. when the transient memory 51 is emptied. When power is switched on again, the pointer from the persistent memory would point to a non-existing transient object, a situation which has to be handled somehow and affords extra complexity. This situation is avoided with the pointer in the stack memory.

When the pointer in the stack memory is storable in a memory location in a control means, transient objects can even be used by different methods and applet invocations, since the stack emptying does not delete the pointer to the non-persistent object. Using a fifth function for executing the saving step and a sixth function for executing the backwriting process provides for an easy tool to control the accessibility of transient objects.

SUMMARY OF THE INVENTION

The proposed solution supports the creation of persistent and temporary objects and the transfer of temporary objects between multiple invocations of an application and requires only minimum support by the runtime system. As basic components can be seen different phases for allocating objects either as persistent or as temporary objects by default ("allocation phases"), a separation between the temporary and persistent environment and the support for free access to both the persistent and the temporary set of objects ("object environment") in the executing application. Either, objects are created persistently or temporarily dependent on the current allocation phase. Before an application is invoked, the type of the allocation phase is predefined by the runtime environment. If for example an application is invoked the first time after it has been loaded into the smartcard, all objects may be allocated into the persistent storage by default. If an application is invoked the first time after the selection by a terminal, allocations may defaultwise be temporary allocations. During the invocation the application is free to change the type of the current allocation phase by calling a function provided by the runtime environment. The runtime system needs only minimum resources to maintain information about these allocation phases. The allocator in the runtime system need keep only one flag which maintains the type of the current allocation phase. Dependent on the value of this flag, objects are either allocated in the persistent or the temporary storage. This allocation scheme does not put any constraints on the management of the object heaps and on the layout of the allocated objects. In order to avoid the aforementioned problems incurred by persistence by reachability, the runtime system rejects any assignment of a reference to a temporary source object to a persistent object. The runtime system performs for every reference assignment the simple check whether the source object resides in temporary memory and the target object resides in persistent store, rejecting reference assignments if this test returns true.

To provide the level of service necessary for smartcard applications as discussed above, the transfer of temporary objects between multiple invocations of an application and the free access to temporary objects within an application can be supported by the runtime via a so-called "transient environment". A programmer can declare such a transient environment by subclassing a specific system class. An application can create an object of that class, store references to temporary objects in that object and register the temporary environment with the runtime system. During each application invocation by the runtime system, the application can retrieve the transient environment from the runtime system, i.e. here the virtual machine, by a system call. The application can then access and manipulate the temporary data in the transient environment at will.

If the runtime system returns an empty temporary environment, (a power down happened between two invocations of an application), the application can create and register a new temporary environment. It can then again retrieve the newly created transient environment during later invocations of the application during this session. If this event, i.e, sudden loss of temporary objects is unacceptable for an application, it can always fall back to persistent storage for such objects.

The main idea as presented here hence is to separate the handling of temporary and persistent objects. Furthermore, the runtime environment provides a mechanism to retain temporary objects as long as possible. The application developer is given full control over when which type of object is allocated in the APDUs. Hereby the benefits of temporary objects can be reaped, while the penalties associated with a standard system solely based on persistent objects, in particular the complexity of the implementation, can be avoided.

DESCRIPTION OF THE DRAWINGS

An example of the invention is depicted in the drawing and described in detail below by way of example. It is shown as an arrangement with a virtual machine and a persistent memory and a non-persistent memory. The FIGURE is for sake of clarity not shown in real dimensions, nor are the relations between the dimensions shown in a realistic scale.

DETAILED DESCRIPTION OF THE INVENTION

In the following, the various exemplary embodiments of the invention are described.

A protocol-handling unit 15, denoted with "PHU", comprises a device driver 16, denoted with "DD", and a read-write unit 17, denoted with "RW". The PHU 15 communicates bidirectionally with a virtual machine 10, also called "VM", serving as control means, which comprises a main loop unit 11, also called "ML", and a function section 12, also called function memory, in which a set of possible functions Function1, Function2, Function3, Function4 is stored in form of machine code. Each function Function1, Function2, Function3, Function4 can be addressable via an identifier.

The VM 10 provides a program counter PC which is assigned to a virtual machine instruction-code-storing means 14 in which code sequences 18 which belong to methods which themselves belong to applets are stored. Applets are collections of data and the therewith-operating methods. The applets themselves are stored as Applet objects 52, 53, short ApO, in a persistent memory 50, short PM.

The code sequences 18 consist of single instruction codes, wherein a zeroth instruction code 30 represents a "new" instruction, a first instruction code 31 represents a "call function" instruction which is followed by an identifying parameter for a bracket-open function, a second instruction code 32 represents a "new" instruction, a third instruction code 33 represents a "call function" instruction which is followed by an identifying parameter for a bracket-close function and a fourth instruction code 34 represents a "new" instruction.

The virtual machine instruction-code-storing means 14, also called code memory or CM 14, is communicated with by the ML 10 which again communicates with the persistent memory 50 and with a non-persistent memory 51, or transient memory, short TM. As the persistent memory 50, e.g. an EEPROM can be used. The PHU 15 further is connected to a random-access memory or RAM 20 which comprises an APDU-object-storing section 21, short AO, and a stack-storing section 22, or stack memory, short St. This St 22 has a bidirectional connection to the function section 12 of the VM 10 and is bound to a stack pointer SP which is provided by the ML 11. The RW 17 can bidirectionally exchange data with the PM 50.

An initialization unit 13, denoted "Ini", is receiving external input via a Power-On line PON and is providing its output to the PHU 15. The PHU 15 receives external input via an input line which delivers application protocol data units, short APDUs. An applet administration unit, also called runtime environment 19, short RTE 19, is communicating bidirectionally with the VM 10.

In the PM 50 two applet objects 52, 53 and two persistent objects 54, 55 are stored. One of the applets 52, 53 is the current applet 52 which is linked to a first object 54 of the persistent objects 54, 55, which again is linked to a second object 55 of the persistent objects 54, 55. The link represents a pointer which makes the persistent objects part of a graph of objects of which the applet object 52 is the beginning.

The same principle applies to the TM 51 in which three non-persistent objects 56, 57, 58, also called transient objects, short TO, are stored as part of an object graph.

A first non-persistent object 56 of the non-persistent objects 56, 57, 58 is linked to a second non-persistent object 57 of the non-persistent objects 56, 57, 58, which itself is linked to a third non-persistent object 58 of the non-persistent objects 56, 57, 58. Each link represents a pointer which makes the non-persistent objects part of a chain with the first non-persistent object 56 is the beginning. Hence here, only one pointer, namely to the first non-persistent object 56, needs to be established in order to reach all non-persistent objects 56, 57, 58.

The selected current applet 52 is selected by the VM 10 which is depicted by a dashed line "select" in the FIGURE. The current applet 52 further determines the current method in the CM 14, also depicted by a dashed line.

The pointer 60 to the first non-persistent object 56, called TOP, is stored in the St 22.

The VM 10 comprises a memory location 61, denoted with StTOP, in form of a memory cell which is dedicated to storing the pointer 60.

The function section 12 has inter alia stored a first function 41, a second function, a third function 43 and a fourth function, a fifth function 45 and a sixth function 46. The according first instruction code 31 is denoted with "call", followed by the parameter which defines which function is called, here denoted with "F(", for the first function 41.

The first function 41, denoted with "Function(", is a bracket-function which marks the beginning of a mode which here is the mode in which any created object is created in the non-persistent memory 51. The according third instruction code 33 is denoted with "call", followed by the parameter which defines which function is called, this parameter here denoted with "F)", for the third function 43.

Hence, the third function 43, denoted with "Function)", is a bracket-function which marks the end of this mode, such that any afterwards created object is created in the persistent memory 50.

The zeroth, second and fourth function are all of the same type, namely of the type for creating an object 54, 55, 56, 57, 58. The according zeroth, second and fourth instruction code 30, 32, 34 is denoted with "new".

The fifth function 45, denoted by "gte", is dedicated to effect the storing of the pointer 60 from the St 22 into the StTOP 61. Thereby the transient environment is received by the VM 10. The sixth function 45, denoted by "ste", is dedicated to effect the reading of the pointer 60 from the StTOP 61 and storing it in the St 22. The transient environment is set in the RAM 20.

The depicted arrangement is preferably arranged on a portable carrier, such as a smartcard, or Javacard. The card can be inserted into a card reader which provides an interface towards external circuitry which communicates with the smartcard via this interface. The interface is to a high degree standardized. APDUs arrive via the card reader at the DD 16 of the PHU 15. The PHU 15 can handle various types of APDUs, which types are "SELECT" APDUs, "READ EE" APDUs, "WRITE EE" APDUs and other APDUs, herein called "standard" APDUs. The type of APDU which is arriving is recognized in the PHU 15.

During an initialization phase, the initialization unit 13 is active. Upon power on, arriving via the PON line, which simply may be the necessary electrical power needed to run the card circuitry, and a reset signal, inter alia the St 22 is cleared, the PC and the SP are reset, the RAM 20 is cleared, and in the St 22 a system APDU object is initialized in that an APDU object header is written. The PHU 15 is then enabled and waiting for input.

As next step, upon arrival of a first APDU which is a SELECT APDU, in the case, when a default applet has not been chosen as the so-called "current applet", the SELECT APDU is recognized by the PHU 15, such that the applet in the CM 14 which is identified by the SELECT APDU is selected to be the current applet 52. Each stored applet contains a number of methods, among which inter alia is stored a process-method, a select-method, an install method and a deselect-method.

The arrival of a standard APDU triggers the use of the predetermined current applet for the standard APDU, and more particularly the process-method of the current applet. The VM execution start address of the process-method of the current applet is the address where the first to execute instruction code for that process-method is stored in the CM 14. This address is known by the RTE 19 which provides via the VM 10 for the PC being set on that address in the CM 14.

The VM 10 begins to interpret the instruction code sequence 18 from the VM execution start address on. This interpretation comprises the determination of the respective functions to be carried out for this instruction code sequence 18, starting with the function for the zeroth instruction code 30 of that instruction code sequence 18.

The functions can perform various actions. A function can e.g. access the PM 50 or the TM 51 or the stack-storing section 22 and can thereby modify the SP and/or the PC of the VM 10. As long as the St 22 is not empty, the PC is incremented either by one step or by the number of steps, an instruction code contains as function, i.e. a "Goto" or "Jump" function.

After completing the function for the last instruction code of a method, the stack pointer SP arrives at a predetermined value indicating to the VM 10 that the stack-storing section 22 is empty. Then, the control is given back to the PHU 15 which returns data, such as status data via the OUT line to the card reader and then expects the next APDU to arrive.

The PHU 15 receives the APDUs and stores them, but usually only one at a time, in the RAM 20 at the area of the APDU object payload, assigned to the existing object header which was generated during the initialization phase.

In the RAM 20, the APDU object is stored, which is then accessible by the instruction codes. Thereby, the instruction codes can access data which is needed to perform a particular action, e.g. reading a number representing a monetary value which is to be charged onto a storage cell, which represents the saldo of an account.

In the case, when a SELECT APDU is recognized by the PHU 15, the current applet is used, but now as a first action the deselect-method thereof is to be used instead of the process-method. The respective instruction code sequence 18 of the deselect-method is hence executed via the VM 10. Afterwards, as a second action, a new current applet is selected according to the information from the SELECT APDU and for the new current applet the select-method is executed by the VM 10.

When a READ APDU is recognized, then the VM 10 is not activated but the memory unit 25 is directly accessed by the PHU 15 for a read-operation, whose result is then output to the card reader via the OUT line. When a WRITE APDU is recognized, then the VM 10 is not activated but the memory unit 25 is directly accessed by the PHU 15 for a write-operation, using the respective part of the content of the WRITE APDU as the new content of a specific memory cell in the memory unit 25. The processing of READ APDUs and WRITE APDUs may be disabled via a suited mechanism, be it a hardware- or a software-implemented mechanism, to avoid misuse of these APDUs for forbidden actions on the smartcard.

When the zeroth instruction code 30 is read, a new object is created, since here this zeroth instruction code 30 is a "new" instruction. The same applies to the second instruction code 32 and the fourth instruction code 34. The system operates in a default mode which here is defined as the mode when any object to be created is created in the persistent memory 50. The first persistent object 54 is created in the persistent memory 50 and a pointer is established between the current applet object 52 and this first persistent object 54.

The next instruction code is the first instruction code 31 which comprises a call to a function, namely the first function 41 which provides a bracket function as a sort of mark or delimiter. This mark signalizes to the system, i.e. the runtime environment 19 or the VM 10, that the new default storing location for objects is the non-persistent memory 51.

The next instruction code is the second instruction code 32 which comprises the "new" function for creating an object which due to the preceding mark, is created in the non-persistent memory 51, as the third transient object 58, assuming that the other two transient objects have already been generated sometime before in the same method. A pointer is established between the second TO 57 and the now generated third TO 58.

The next instruction code is the third instruction code 31 which comprises a call to a function, namely the third function 43 which provides a bracket function as a sort of mark or delimiter. This mark signalizes to the system, i.e. the runtime environment 19 or the VM 10, that the new default storing location for objects is no longer the non-persistent memory 51 and hence is again the persistent memory 50. So the object created is the second persistent object 55 which is pointed to by a pointer from the first persistent object 54.

The transient objects 56, 57, 58 are linked together and have one basic pointer which is the transient-object pointer 60 which is stored in the St 22. Since the stack is emptied automatically between subsequent applet invocations, no stack content can be handed over from one process or SELECT method to another without using an assistant system. This assistant system comprises the StTOP 61 and uses the fifth function 45 and the sixth function 46. The general purpose is to save the TOP 60 in a memory which is not emptied after execution of a method. This memory is realized in form of the StTOP 61. If a method is supposed to save the TOP 60 for a subsequent method, the fifth function 45 is called by a corresponding instruction code. The pointer 60 is hence then saved in the StTOP 61 and survives the emptying of the St 22.

When a new process or SELECT method sometimes afterwards wants to access the transient objects 56, 57, 58, the sixth function 46 is used for writing the content of the StTOP 61 into the ST 60.

The transient objects 56, 57, 58 are deleted automatically when an applet is deselected or when the power is shut off.

The number of instruction codes, storage cells, functions a.s.o. is exemplary only and hence not limited to the herein chosen number. Additionally, a heap memory can be arranged in the RAM 20, which heap memory can also be accessible by the functions.

(Javacard is a Trademark of Sun Microsystems, Inc.)

What is claimed is:

1. A method for creating an object in a non-persistent memory, in a resource constrained system having limited non-persistent memory and a persistent memory of greater capacity than said non-persistent memory, wherein, as a default, objects are created in said persistent memory, the method comprising:

reading out a first instruction code from an instruction code sequence which effects execution of a first function, and reading out a second instruction code which effects execution of a second function which effects the creation of said object in a memory, whereby said first function effects the choice of said non-persistent memory as said memory, instead of said persistent memory.

2. A device for carrying out a method according to claim 1, further comprising a smartcard.

3. A device for carrying out a method according to claim 1, further comprising a Javacard.

4. A device for carrying out a method according to claim 1, further comprising electronic circuitry therefor.

5. A method according to claim 1, wherein the first function comprises a function of a bracket-open type.

6. A method according to claim 1, further comprising, reading a third instruction code which effects the execution of a third function which effects the choice of a persistent memory as said memory, and reading a fourth instruction code which when read out effects the execution of a fourth function which effects the creation of another object in said persistent memory.

7. A method according to claim 6, wherein the third function comprises a function of a bracket-close type.

8. A method according to claim 1, wherein at least some of the objects in the non-persistent memory are linked, by a chain starting from a first of said objects.

9. A method according to claim 8, further comprising storing a pointer to one of the objects in the non-persistent memory, in a stack memory.

10. A method according to claim 9, wherein the pointer in the stack memory is storable in a memory location in a control means.

11. A method according to claim 10, further comprising executing a fifth function which effects that the pointer in the stack memory is stored in the memory location in the control means.

12. A method according to claim 10, further comprising executing a sixth function which effects that the pointer is written into the stack memory from the memory location in the control means.

13. A method according to one of claim 1 wherein the objects in the persistent memory are linked, by a chain starting from a first of said objects.

14. An article of manufacture comprising a computer usable medium having computer readable program code means embodied therein for causing creation of an object in a non-persistent memory, in a resource constrained system having a limited non-persistent memory and a persistent memory of greater capacity than said non-persistent memory, wherein, as a default, objects are created in said persistent memory, the computer readable program code means in said article of manufacture comprising computer readable program code means for causing a computer to effect:

reading out a first instruction code from an instruction code sequence which effects execution of a first function, and reading out a second instruction code which effects execution of a second function which effects the creation of said object in a memory, whereby said first function effects the choice of said non-persistent memory as said memory, instead of said persistent memory.

15. An article of manufacture as recited in claim 14, wherein the first function comprises a function of a bracket-open type.

16. An article of manufacture as recited in claim 14, the computer readable program code means in said article of manufacture further comprising computer readable program code means for causing a computer to effect reading out a third instruction code which effects the execution of a third function which effects the choice of a persistent memory as said memory for a fourth instruction code which when being read out effects the execution of a fourth function which effects the creation of another object in said persistent memory.

17. An article of manufacture as recited in claim 14, wherein the third function comprises a function of a bracket-close type.

18. An article of manufacture as recited in claim 14, wherein at least a plurality of the objects in the non-persistent memory are linked by a chain starting from a first object of said objects.

19. An article of manufacture as recited in claim 18, wherein the objects linked are linked in a form of a chain starting from a first object of said objects.

20. A device for creating an object in a non-persistent memory in a resource constrained system having a limited non-persistent memory and a persistent memory of greater capacity than said non-persistent memory, wherein, as a default, objects are created in said persistent memory, comprising storing means for storing an instruction code sequence, and control means for reading instruction codes out of said instruction code sequence, and wherein a first function is executable in the case when a first instruction code is read out, and wherein a second function is executable in the case when a second instruction code is read out, which second function effects the creation of said object in a memory, whereby said first function effects the choice of said non-persistent memory as said memory, instead of said persistent memory.

21. A device according to claim 20, further comprising a third function executable in the case when a third instruction code is read out of said instruction code sequence, which third function effects the choice of a persistent memory as said memory for a fourth instruction code which when being read out effects the execution of a fourth function which effects the creation of another object in said persistent memory.

22. A device according to claim 20, wherein the objects in the non-persistent memory are linked by a chain starting from a first of said objects.

23. A device according to claim 22, further comprising a control means, a stack memory and a pointer to the first object in the non-persistent memory stored in said stack memory, said pointer being storable in a memory location in said control means.

24. A device according to claim 23, further comprising a fifth function executable to effect that the pointer in the stack memory is stored in the memory location in the control means.

25. A device according to claim 23, further comprising a sixth function executable to effect that the pointer is written into the stack memory from the memory location in the control means.

26. A device according to claim 20, wherein objects in the persistent memory are linked, by a chain starting from a first of said objects.

27. A device according to claim 20, configured as one of a smartcard, a Javacard, and electronic circuitry therefor.

28. A method for maintaining accessibility of a first object stored in a non-persistent memory of a resource constrained system having a limited non-persistent memory and a persistent memory of greater capacity than said non-persistent memory, wherein as a default, objects are created in said persistent memory, comprising:

storing a pointer to said first object in said non-persistent memory in a stack memory, said pointer in said stack memory being writable to and readable from a persistent memory location in a control means, and executing a function to effect said storing.

29. A method according to claim 28, wherein an additional function is executed which effects that the pointer is written into the stack memory from the memory location in the control means.

30. A computer program product comprising a computer usable medium having computer readable program code means embodied therein for causing accessibility of a first object stored in a limited non-persistent memory of a resource constrained system having said limited non-persistent memory and a persistent memory of greater capacity than said non-persistent memory, wherein, as a default, objects are created in said persistent memory, the computer readable program code means in said computer program product comprising computer readable program code means for causing a computer to effect storing a pointer to said first object in said non-persistent memory in a stack memory, wherein said pointer in said stack memory is writable to and readable from a persistent memory location in a control means.

31. A computer program product as recited in claim 30, wherein the step of storing is effectable by an execution of a fifth function.

32. A computer program product as recited in claim 30, the computer readable program code means in said computer program product further comprising computer readable program code means for causing a computer to effect executing a sixth function which effects that the pointer is written into the stack memory from the memory location in the control means.

33. A method for creating an object in a non-persistent memory, in a resource constrained system having a limited non-persistent memory and a persistent memory of greater capacity than said non-persistent memory, wherein, as a default, objects are created in said persistent memory, the method comprising:

reading out a first instruction code from an instruction code sequence which effects execution of a first function, and reading out a second instruction code which effects execution of a second function which effects the creation of said object in a memory, whereby said first function effects the choice of said non-persistent memory as said memory, instead of said persistent memory.

34. A method for maintaining accessibility of a first object stored in a limited non-persistent memory in a resource constrained system having said limited non-persistent memory and a persistent memory of greater capacity than said non-persistent memory, wherein, as a default, objects are created in said persistent memory, the method comprising storing a pointer to said first object in said non-persistent memory in a stack memory, wherein said pointer in said stack memory is writable to and readable from a persistent memory location in a control means.

* * * * *